United States Patent [19]

Lüpertz et al.

[11] 4,219,106
[45] Aug. 26, 1980

[54] BRAKE SHOE HOLDING DEVICE FOR A SPOT-TYPE DISC BRAKE

[75] Inventors: Hans-Henning Lüpertz, Darmstadt; Vlad Marianu, Frankfurt-Griesheim, both of Fed. Rep. of Germany

[73] Assignee: ITT Industries, Inc., New York, N.Y.

[21] Appl. No.: 2,494

[22] Filed: Jan. 11, 1979

[30] Foreign Application Priority Data

Feb. 4, 1978 [DE] Fed. Rep. of Germany ......... 2804808

[51] Int. Cl.³ .............................................. F16D 65/09
[52] U.S. Cl. .................................................. 188/73.6
[58] Field of Search .................... 188/73.1, 73.3, 73.6, 188/206 A, 206 R

[56] References Cited
U.S. PATENT DOCUMENTS 4,044,864  8/1977  Karasundani ....................... 188/73.3

Primary Examiner—Duane A. Reger
Attorney, Agent, or Firm—John T. O'Halloran; Alfred C. Hill

[57] ABSTRACT the brake shoe holding device includes two support members spaced apart from each other in the direction of a secant relative to the brake disc each having grooves which are opened radially outwardly on each side of the brake disc to slidably guide an associated end of an associated brake shoe. Each of the grooves are formed to cooperate with an associated end of an associated brake shoe so that frictional force ocurring at the brake shoes, at least in the presence of increased brake-applying force, is transmitted to both support members.

12 Claims, 4 Drawing Figures

# BRAKE SHOE HOLDING DEVICE FOR A SPOT-TYPE DISC BRAKE

BACKGROUND OF THE INVENTION

This invention relates to spot-type disc brakes and more particularly to a brake shoe holding device therefore.

Brake shoe holding devices for spot-type disc brake including two support members spaced apart from each other with a brake shoe slidably guided on the support members in the direction of brake application and positively connected with the support members in the peripheral direction of the brake disc such that at least in the presence of increased brake-applying forces the frictional force occurring at the brake shoe is transmitted to both support members because they ensure even wear of the brake shoes and because the distribution of the frictional force on both support members results in good utilization of the material.

In a known spot-type disc brake disclosed in German Patent No. DT-AS 1,575,920, the brake shoe holding device includes two supporting bolts forming a disengageable screw connection with the brake housing and extending through two openings in the pad backing plate with clearance, the center-to-center distance between the two openings being smaller than the center-to-center distance between the two supporting bolts by the amount of the maximum elastic deformation of a supporting bolt.

The disadvantage of this known brake shoe holding device is that it allows brake-shoe replacement only if the supporting bolts which receive the frictional force, are unscrewed. As a result, the replacement of brake shoes requires the removal of several screws which must be tightly seated to provide the functional safety of the brake. Pad replacement is thus complicated and entails a safety risk which should be avoided by all means. Moreover, the dimensional tolerance for the center-to-center distance between the supporting bolts which is due to the screw connection would be assumed to reach a magnitude at which distribution of the frictional force on both supporting bolts in a desired ratio is not reliably attainable.

Another brake shoe holding device of the above type described in British Patent No. 938,977 includes two spaced plane plate-type calipers straddling the outer periphery of a brake disc and having recesses on both sides of the brake disc to receive the brake shoes comprised of a backing plate and a friction pad. The backing plates of the brake shoes have at their radially inward and radially outward edge slots for positive engagement with the calipers. In this known arrangement, the frictional forces occurring at the brake shoes when the brake is actuated are transmitted to both calipers because the calipers, in the direction of application of the frictional forces, have a low inherent rigidity and obtain the rigidity required for taking up the forces only by the arrangement of the pad backing plates in the form of a transverse wall. It is a substantial disadvantage in this known brake shoe holding device that the brake shoes may become jammed relative to the calipers so that actuation of the brake is impaired. Further, brake shoe replacement is only possible after unscrewing and lifting off of the brake caliper from the brake disc.

SUMMARY OF THE INVENTION

It is an object of the present invention to provide a brake shoe holding device for a spot-type disc brake of the type referred to above, which is open in the radial direction, permits simultaneous transmission of the frictional forces at both ends of a brake shoe, the ends lying in the direction of a secant relative to the brake disc, and ensures safe abutment of the brake shoe with the guiding surfaces of the brake carrier.

A feature of the present invention is the provision of a brake shoe holding device for a spot-type disc brake comprising: two support members spaced apart from each other in the direction of a secant relative to a brake disc; each of the support members having at least a first groove therein parallel to the rotational axis of the brake disc and disposed on one side of the brake disc to slidably guide a first brake shoe in the direction of brake application, and to positively connect the first brake shoe to both of the support members in the peripheral direction of the brake disc such that at least in the presence of increased brake-applying forces the frictional force occurring at said first brake shoe is transmitted to both of the support members; each of said first grooves being open radially outwardly to receive an associated end of the first brake shoe and having a first wall surface extending from within the outer periphery of the brake disc to a point outside the outer periphery of the brake disc, a second wall surface parallel to the first wall surface disposed between the first wall surface and the center of the brake disc wholly within the outer periphery of the brake disc, and a third wall surface disposed at right angles to and interconnecting the first and second wall surfaces within the outer periphery of the brake disc, and each end of the first brake shoe having a first radially inwardly directed shoulder having first supporting surfaces slidably engaging the first, second and third wall surfaces.

The brake shoe holding device of this invention permits replacement of the brake shoe radially outwardly without the necessity of removing the support members of the brake carrier.

By arranging the wall surface effective on the disc entry side radially inwardly, and by arranging the wall surface effective on the disc exit side radially outwardly of the disc periphery, it is further ensured that the ends of the brake shoe are urged into the grooves with a radially inwardly directed force component, even if the ends bear upon one support member only. This arrangement eliminates the need for special positive-engagement means securing the brake shoe in its mounting position. It is sufficient to provide resilient means with a small preload to prevent displacement of the brake shoe out of its mounting position when the brake is released and to avoid rattling noises in the guides.

By providing a distance between first and second wall surfaces on the support members effective in one direction of rotation equal to or slightly greater than the distance the supporting surfaces on the brake shoes engaged therewith the frictional forces acting on the brake shoes at low brake-applying forces are not only transmitted to the rear support member of the brake carrier, when viewed in the direction of brake-disc rotation. Rather, the range of manufacturing tolerances is chosen such that either both support members take up the force simultaneously, or the brake shoes initially bear only upon the front support member, when viewed in the direction of brake-discrotation. This results in an even wear of the brake shoes in the tangential direction relative to the brake disc. When the frictional forces occurring on the brake shoes become greater with the brake-applying force increasing, both brake shoes bear also upon the rear support member as a result of the elastic deformation of the front support member which is initially loaded alone, so that the frictional forces are distributed to both support members. In order to obtain a distribution of the frictional forces to both support members as even as possible, the distance between the wall surfaces effective in one direction of rotation and the distance between the cooperating supporting surfaces on the brake shoes is to be as small as possible.

An increase in the radially inwardly directed force component on the ends of the brake shoe on the disc entry side may be obtained by having the second wall surfaces and the supporting surfaces of the brake shoes engaged therewith inclined toward the groove bottom in the sense of enlarging the grooves, with the minimum distance between the supporting surfaces of the brake shoes being greater than the maximum distance between the wall surfaces.

By providing the tangential ends of the brake shoes with radially outwardly directed confronting supporting surfaces against which the brake caliper abuts without clearance, there results an advantageous stiffening effect of the ends of the brake shoes because the arrangement of the brake caliper prevents bending of the brake-shoe ends. It is preferably only the ends of the brake shoe bearing upon the free ends of the support members that take support on the brake caliper. Therefore, the amount of elastic deformation of the ends of this brake shoe is smaller than the amount of elastic deformation of the other brake shoe, as a result of which the influence, which the different displacement of the brake shoes on both sides of the brake disc exerts on the distribution of the frictional forces to both support members because of the elastic deformation of the support members, is reduced. Further, the uneven tangential wear of the brake shoes caused by elastic deformation of the support members may be reduced thereby.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
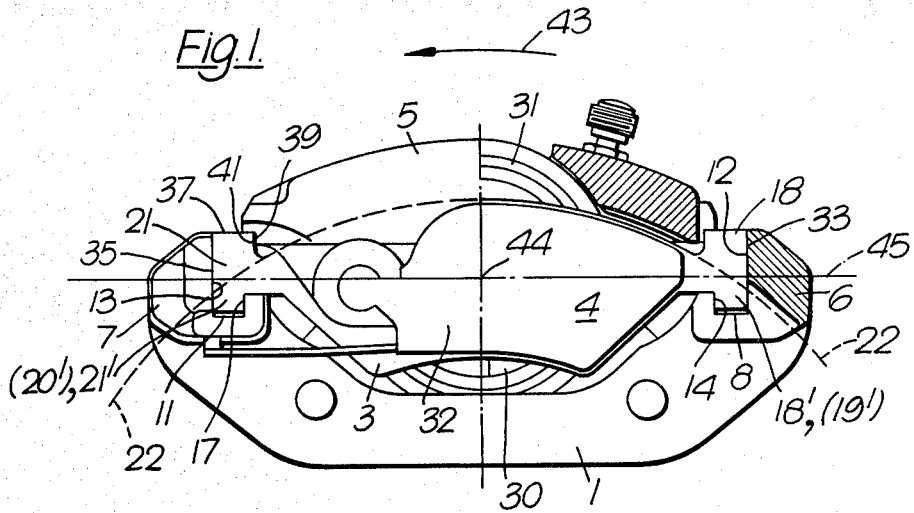
FIG. 1 is a view of a disc brake embodying a brake shoe holding device in accordance with the principle of the present invention, viewed in the direction of the brake-disc axis.

The embodiment shown in the drawings is a floating-caliper spot-type disc brake for automotive vehicles having a brake carrier 1 to be fastened to the steering knuckle of an automotive vehicle in a non-displaceable manner relative to a brake disc 2. Carrier 1 provides an axially slidable guide and support for brake shoes 3 and 4 which are disposed on opposite sides of brake disc 2 and for a brake caliper 5 which embraces the periphery of brake disc 2 and the brake shoes 3 and 4 from the outside in the form of a U. In the direction of a secant relative to brake disc 2, brake carrier 1 has two spaced apart support members 6 and 7 straddling the periphery of brake disc 2. Support member 6 includes groove 8 on one side of brake disc 2 and groove 9 on the other side of brake disc 2 and support member 7 includes groove 10 on the one side of brake disc 2 and groove 11 on the other side of brake disc 2 in which the associated ends of brake shoes 4 and 3, respectively, lying in the direction of the secant, are guided and supported. The wall surfaces of the groove pairs 8, 9 and 10, 11 disposed in support member 6 and 7 respectively, lie for each pair in common planes extending parallel to the axis of rotation of brake disc 2 and are preferably machined in an operation common to both grooves, for example, by broaching. The wall surface 12 facing the center of brake disc 2 is common to grooves 8 and 9, and the wall surface 13 facing the center of brake disc 2 is common to grooves 10 and 11. The wall surfaces of grooves 8 through 11 opposite the respective wall surfaces 12 and 13 are identified by numerals 14, 15, 16, and 17. The wall surfaces 14 through 17 end within the outer periphery 22 of brake disc 2 where they are conterminous to supporting surfaces 25, 26, 24 and 23, respectively, lying in a common plane extending in the direction of the secant.

Resting against the supporting surfaces 23 through 26 are the backing plates of brake shoes 3 and 4 whose ends 18, 19, 20 and 21 extend up to wall surfaces 12 and 13 where they take support with their front faces 33 through 36 outside outer periphery 22 of brake disc 2. Provided on the ends 18 through 21 of brake shoes 3 and 4 are radially inwardly extending shoulders 18' through 21' whose confronting front surfaces abut against wall surfaces 14 through 17. In this arrangement, the clearance between wall surfaces 14 through 17 and the front surfaces of shoulders 18' through 21' is equal to or smaller than the clearance between front faces 33 through 36 and wall surfaces 12 and 13. It is thereby ensured that the frictional forces exerted on brake shoes 3 and 4 during braking are transmitted to either the front support member solely, when viewed in the direction of brake-disc rotation, or both support members 6 and 7. In no case, however, will the frictional forces be transmitted to solely the rear support member, when viewed in the direction of brake-disc rotation.

Brake caliper 5 is axially slidably connected with brake carrier 1 by means of pin guides 27 disposed on the side of brake carrier 1 remote from brake disc 2. Between pin guides 27 brake caliper 5 has a hydraulic brake-actuating cylinder 28 which is supplied with fluid through a port 29. The piston 30 of actuating cylinder 28 rests with its front surface directly against brake shoe 4. A rubber boot 31 protects the sliding surface of piston 30 against damage and contamination.

On the side of brake disc 2 opposite actuating cylinder 28, brake caliper 5 rests against the radial outer front surfaces 37 and 38 of ends 19 and 21 of brake shoe 3 and is urged against brake shoe 3 by a leaf spring 32 fixed to brake caliper 5 and bearing upon support members 6 and 7.

Towards the center of the brake, front surfaces 37 and 38 of brake shoe 3 are limited by supporting surfaces 39 and 40 extending parallel to front faces 34 and 45 and providing a support for lateral surfaces 41 and 42 of brake caliper 5. By this arrangement, brake caliper 5 is guided with its end remote from brake-actuating cylinder 28 in the direction of the secant. At the same time, brake caliper 5 provides with its portion lying between supporting surfaces 39 and 40, a support which results in a reduction of the bending stresses occurring at the ends 18 and 19 of the back plate of brake shoe 3. Therefore even in the presence of maximum frictional forces, the ends of brake shoe 3 are subject to only a small amount of elastic deformation. Brake shoe 4 is designed in the same manner as brake shoe 3, its ends 18 and 20, do not, however, abut against brake caliper 5. As a result, the ends of brake shoe 4 are subject to a stronger elastic deformation than the ends of brake shoe 3 when the frictional forces are at their maximum. The reverse applies as regards the suspension of brake shoes 3 and 4. Brake shoe 4 is suspended in a stiffer area of brake carrier 1 than brake shoe 3 so that in the presence of maximum frictional forces the elastic deformation of brake carrier 1 makes itself felt on brake shoe 4 to a lesser degree than it does on brake shoe 3. By virtue of the different elasticity of the brake shoes' ends, it is possible to balance the effect of the different elasticity of the brake carrier on the brake shoes, so that both brake shoes 3 and 4 perform the same movements in the direction of the secant under the action of the frictional forces, in spite of their different arrangement in brake carrier 1. Since brake caliper 5 is in frictional engagement with brake shoes 3 and 4 during brake actuation, this arrangement avoids misalignment of brake caliper 5 relative to brake disc 2.

Figure 2:
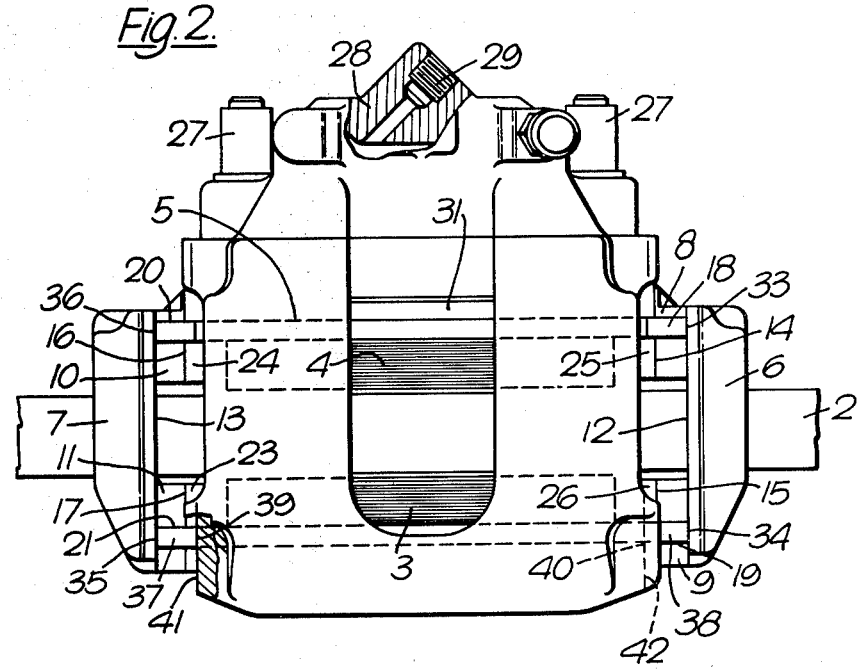
FIG. 2 is a top plan view of the disc brake of FIG. 1.

The operation of the brake shoe holding device of the present invention will be described more specifically with reference to FIGS. 1 and 2. When viewing the figure, it is assumed that brake disc 2 rotates counterclockwise as indicated by arrow 43. The line of application 45 of the resultant frictional forces passes through point 44 and is essentially perpendicular to the brake-disc radius passing through point 44. If the clearances between the wall surfaces 14 through 17 and the adjacent front surfaces of brake shoes 3 and 4, which are conditioned by manufacture, are smaller than the clearances between wall surfaces 12 and 13 and front faces 33 through 36, brake shoes 3 and 4 will initially bear against wall surfaces 14 and 15 when brake disc 2 rotates in the direction indicated. Since the line of application 45 of the resultant frictional forces is above the upper edge of wall surfaces 14 and 15, a torque will be produced on brake shoes 3 and 4 which tends to urge the ends 20 and 21 of brake shoes 3 and 4 against the supporting surfaces 23 and 24. Ends 18 and 19 as a result of their frictional engagement with wall surfaces 14 and 15, are held in their rest position on supporting surfaces 25 and 26. If brake shoes 3 and 4 bear with their front faces 35 and 36 against wall surface 13 under increased clearance between their front surfaces and wall surfaces 14 through 17 or after elastic deformation of support member 6, the position of wall surface 13 radially outside the line of application 45 causes a torque to be produced on brake shoes 3 and 4, which tends to urge ends 18 and 19 of brake shoes 3 and 4 against supporting surfaces 25 and 26. Therefore, the design of the brake shoe suspension provides for safe bearing of the brake shoes on the supporting surfaces 23 through 26 even under high loads. Because of the laterally reversed design of brake shoes 3 and 4, this applies of course to both directions of rotation of brake disc 2. Particularly in brakes for passenger cars it may also be sufficient to provide the shoulders 18' and 19' only atthe front ends of the brake shoe when viewed in the main direction of brake-disc rotation (forward driving), because the maximum frictional forces occurring in the reverse direction of rotation (rearward driving) are smaller and can be absorbed by one support member only.

Figures 3, 4:
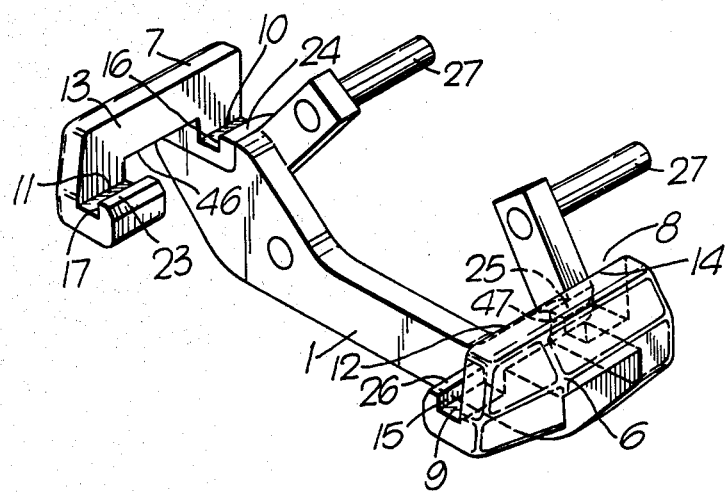
FIG. 3 is a perspective view of the brake carrier of the disc brake of FIG. 1.
FIG. 4 is a brake shoe with elastic ends which may be employed in the disc brake of FIG. 1.

FIG. 4 shows a brake shoe whose ends are designed particularly elastically in order to be able to compensate for the elastic deformations of the brake carrier and the support members in the above-described manner. When the brake shoe 48 is used in a spot-type disc brake of the type illustrated in FIGS. 1 to 3 instead of brake shoe 3, its ends 52 and 53 bear against the brake caliper through the supporting surfaces 54. Therefore, the frictional force to be transmitted causes only a tensile strain or pressure load in the ribs 57 and no material elastic deformation. If, however, brake shoe 48 is used instead of brake shoe 4, there occurs elastic deformations of its ends 52 and 53 as indicated in FIG. 4 by broken lines.

The resultant frictional force acting at point 51 in the direction of the arrow is transmitted to support member 6 via the right-hand rib 57 and the front surface 55, and to support member 7 via the left-hand rib 57 and the front surface 56. Indentations 49 limit the cross section of ribs 57 to the size required to provide the desired elasticity. Because of the position of surfaces 55 and 56 radially outside and radially inside ribs 57, a bending moment occurs at ends 52 and 53 of brake shoe 48 which, because of the elasticity of ribs 57, causes twisting of brake shoe ends 52 and 53 in the direction indicated by little arrows into the position illustrated by broken lines. In order to avoid jamming of ends 52 and 53 in the grooves of support members 6 and 7, surfaces 50 are in addition recessed radially within front surfaces 56. In this arrangement, the elasticity of ribs 57 is advantageously rated such that the displacement of brake shoe 48 in the direction of the frictional force corresponds to the elastic deformation of the support members in the area of the other brake shoe. The displacement of brake shoe 48 in the direction of the frictional force can also be limited by abutment surfaces on the brake caliper which are located at a small distance opposite supporting surfaces 54 on brake-shoe ends 52 and 53.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake shoe holding device for a spot-type disc brake comprising:
   two support members spaced apart from each other in the direction of a secant relative to a brake disc;
   each of said support members having at least a first groove therein parallel to the rotational axis of said brake disc and disposed on one side of said brake disc to slidably guide a first brake shoe in the direction of brake application and to positively connect said first brake shoe to both of said support members in the peripheral direction of said brake disc such that at least in the presence of increased brake-applying forces the frictional force occurring at said first brake shoe is transmitted to both of said support members;
   each of said first grooves being open radially outwardly to receive an associated end of said first brake shoe and having a first wall surface extending from within the outer periphery of said brake disc to a point outside the outer periphery of said brake disc, a second wall surface parallel to said first wall surface disposed between said first wall surface and the center of said brake disc wholly within the outer periphery of said brake disc, and a third wall surface disposed at right angles to and interconnecting said first and second wall surfaces within the outer periphery of said brake disc; and each end of said first brake shoe having a first radially inwardly directed shoulder having first supporting surfaces slidably engaging said first, second and third wall surfaces.

2. A holding device according to claim 1, wherein each of said supporting members further include a second groove therein parallel to the rotational axis of said brake disc and disposed on the other side of said brake disc to slidably guide a second brake shoe in the direction of brake application and to positively connect said second brake shoe to both of said support members in the peripheral direction of said brake disc such that at least in the presence of increased brake-applying force the frictional force occurring at said second brake shoe is transmitted to both of said support members;

each of said second grooves being open radially outwardly to receive an associated end of said second brake shoe and having a fourth wall surface extending from within the outer periphery of said brake disc to a point outside the outer periphery of said brake disc, a fifth wall surface parallel to said fourth wall surface disposed between said fourth wall surface and the center of said brake disc wholly within the outer periphery of said brake disc, and a sixth wall surface disposed at right angles to and interconnecting said fourth and fifth wall surfaces within the outer periphery of said brake disc; and each end of said second brake shoe having a second radially inwardly directed shoulder having second supporting surfaces slidably engaging said fourth, fifth and sixth wall surfaces.

3. A holding device according to claim 2, wherein each of said first and second grooves are sections of a continuous groove interrupted by a recess, each of said first and fourth wall surfaces being a continuous wall surface having a recess therein to straddle said brake disc.

4. A holding device according to claim 3, wherein the distance between each of said first wall surfaces, each of said second wall surfaces, each of said fourth wall surfaces and each of said fifth wall surfaces is equal to or slightly greater than the distance between cooperating ones of each of said first and each of said second supporting surfaces.

5. A holding device according to claim 3, wherein each of said second wall surfaces, each of said fifth wall surfaces, cooperating ones of said first supporting surfaces and cooperating ones of said second supporting surfaces are inclined toward each of said third and sixth wall surfaces in the sense of enlarging each of said first and second grooves with the minimum distance between said cooperating ones of said first and second supporting surfaces being greater than the maximum distance between each of said second wall surfaces and each of said fifth wall surfaces.

6. A holding device according to claim 3, wherein each of said support members are carried by a brake carrier having means to floatingly guide a brake caliper, and at least one of said first and second brake shoes includes third supporting surfaces against which said brake caliper abuts without clearance.

7. A holding device according to claim 6, wherein said first brake shoe is directly actuated by an actuating device, and said second brake shoe carries said third supporting surfaces.

8. A holding device according to claim 2, wherein at least one of said first and second brake shoes includes a first rib disposed between the body of said one of said first and second brake shoes and at least one end thereof, said one end having oppositely directed third and fourth shoulders extending from said first rib with third supporting surfaces thereon engaging an appropriate one of said first, second, fourth and fifth wall surfaces for transmission of the frictional force to the appropriate one of said support members.

9. A holding device according to claim 8, wherein said first rib is elastically deformable under action of the frictional force.

10. A holding device according to claim 8, wherein a second rib is disposed between the body of said one of said first and second brake shoes and the other end thereof, said other end having oppositely directed fifth and sixth shoulders extending from said second rib with fourth supporting surfaces thereon engaging an appropriate one of said first, second, fourth and fifth wall surfaces for transmission of the frictional force to the other of said support members.

11. A holding device according to claim 10, wherein said first and second ribs are elastically deformable under action of the frictional force.

12. A holding device according to claim 11, wherein the surface of said third and fourth supporting surfaces engaging the appropriate one of said first and fourth wall surfaces includes a first portion engaging the appropriate one of said first and fourth wall surfaces in an area above the appropriate one of said second and fifth wall surfaces and second portion inclining away from the appropriate one of said first and fourth wall surfaces.

* * * * *